(12) United States Patent
Halliday et al.

(10) Patent No.: US 8,441,890 B2
(45) Date of Patent: May 14, 2013

(54) REMOVING GROUND-ROLL FROM GEOPHYSICAL DATA USING SOURCE-RECEIVER INTERFEROMETRY

(75) Inventors: David Fraser Halliday, Kingsbarns (GB); Andrew Curtis, Edinburgh (GB)

(73) Assignee: WesternGeco L.L.C., Houston, TX (US)

( * ) Notice: Subject to any disclaimer, the term of this patent is extended or adjusted under 35 U.S.C. 154(b) by 368 days.

(21) Appl. No.: 12/848,428

(22) Filed: Aug. 2, 2010

(65) Prior Publication Data

US 2011/0044132 A1    Feb. 24, 2011

Related U.S. Application Data

(60) Provisional application No. 61/236,000, filed on Aug. 21, 2009.

(51) Int. Cl.
*G01V 1/36* (2006.01)
*G01V 1/00* (2006.01)

(52) U.S. Cl.
USPC .................... 367/38; 367/54; 367/56; 367/58

(58) Field of Classification Search .................... 367/38, 367/54, 56, 58; 702/17
See application file for complete search history.

(56) References Cited

U.S. PATENT DOCUMENTS

2007/0104028 A1    5/2007    Van Manen et al.

OTHER PUBLICATIONS

Dong et al, "Interferometric Prediction and Least Squares Subtraction of Surface Waves", 76th Annual Seg International Meeting (New Orleans, LA, Oct. 1, 2006) Technical Program.*
Halliday et al, "Seismic surface waves in a suburban environment: Active and passive interferometric methods", The Leading Edge, Feb. 2008.*
Halliday et al, "Seismic interferometry, surface waves and source distribution", Geophys. J. Int. (2008) 175, p. 1067-1087.*
Halliday et al, "Interferometric surface-wave isolation and removal", Geophysics vol. 72, No. 5 (Sep.-Oct. 2007), p. A69-A73.*
Curtis, Source-Receiver Seismic Interferometry, 2009, pp. 3655-3659, SEG International Exposition and Annual Meeting.
Halliday, Surface Wave Interferometry, 2009, Chapter 8, Thesis, University of Edinburg.
Vasconcelos, et al., Representation Theorems and Green's Function Retrieval for Scattering in Acoustic Media, 2009, vol. 80, Physical Review E.

* cited by examiner

*Primary Examiner* — Cassie Galt

(57) ABSTRACT

A method for processing geophysical data. The method includes applying a first interferometry on an estimate of a direct ground roll between a receiver location and one or more boundary source locations and an estimate of a direct ground roll between one or more boundary receiver locations and each boundary source location to generate an interferometric estimate of a direct ground roll between the receiver location and each boundary receiver location. The method then includes applying a second interferometry on geophysical data between the source location and each boundary receiver location and the interferometric estimate of the direct ground roll between the receiver location and each boundary receiver location to generate an interferometric estimate of a direct and scattered ground roll between the source location and the receiver location. After applying the second interferometry, the method then includes removing the interferometric estimate of the direct and scattered ground roll between the source location and the receiver location from geophysical data acquired at the receiver location due to a source at the source.

21 Claims, 6 Drawing Sheets

REMOVING GROUND-ROLL FROM GEOPHYSICAL DATA USING SOURCE-RECEIVER INTERFEROMETRY

CROSS-REFERENCE TO RELATED APPLICATIONS

This application claims benefit of U.S. provisional patent application Ser. No. 61/236,000, filed Aug. 21, 2009, which is incorporated herein by reference.

BACKGROUND

1. Field of the Invention

Implementations of various technologies described herein generally relate to geophysical data processing.

2. Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Seismic exploration is conducted on both land and in water. In both environments, exploration involves surveying subterranean geological formations for hydrocarbon deposits. A survey typically involves deploying acoustic source(s) and acoustic sensors/receivers at predetermined locations. The sources impart acoustic waves into the geological formations. Features of the geological formation reflect the acoustic waves to the sensors. The sensors receive the reflected waves, which are detected, conditioned, and processed to generate seismic data. Analysis of the seismic data can then indicate probable locations of the hydrocarbon deposits.

However, not all of the acoustic waves propagate downward into the geological formation. Some of the acoustic waves are "interface waves" that propagate along an interface between two media instead of through a medium. An interface wave can travel at the interface between the Earth and air—e.g., surface waves—, between the Earth and a body of water—e.g., Scholte waves—, or between a shallow interface within the near-surface of the Earth—e.g., refracted shear waves. Surface waves or seismic waves that propagate laterally through the near surface of the Earth often create a "ground roll" in acquired seismic data. Ground roll is a type of coherent noise generated by a surface wave that can obscure signals reflected from the geological formation and degrade overall quality of the seismic data resulting from the survey. Consequently, most surveys attempt to eliminate, or at least reduce, ground roll. In the following, the term, ground roll, will be used to refer to surface waves, as is common in the exploration industry.

Techniques for mitigating ground roll include careful selection of source and geophone arrays during the survey and filters and stacking parameters during processing. However, because the ground roll can be heavily (back)scattered by near-surface heterogeneities, conventional frequency and wave number ("FK")-filtering techniques are often unsuccessful: the noise is distributed over a large range of (out-of-plane) wave numbers outside the expected FK-slice in a manner that is difficult to predict without highly detailed knowledge of the near-surface scatterers.

The phenomenon of interface waves is described above in the context of seismic surveying. However, their existence is not limited to that technology. The phenomenon may also be encountered in electromagnetic surveying or non-destructive testing (i.e., geophysical data), for instance. Interface waves raise similar concerns and have similar effects on the efficacy of these technologies as well.

SUMMARY

Described herein are implementations of various technologies for removing ground roll from geophysical data using source-receiver interferometry. In one implementation, a method for processing geophysical data may include applying a first interferometry on an estimate of a direct ground roll between a receiver location and one or more boundary source locations and an estimate of a direct ground roll between one or more boundary receiver locations and each boundary source location to generate an interferometric estimate of a direct ground roll between the receiver location and each boundary receiver location. The method may then include applying a second interferometry on geophysical data between the source location and each boundary receiver location and the interferometric estimate of the direct ground roll between the receiver location and each boundary receiver location to generate an interferometric estimate of a direct and scattered ground roll between the source location and the receiver location. After applying the second interferometry, the method may remove the interferometric estimate of the direct and scattered ground roll between the source location and the receiver location from geophysical data acquired at the receiver location due to a source at the source location.

In another implementation, the method for processing geophysical data described above may perform the second interferometry using an estimate of a direct ground roll between the source location and each boundary receiver location in place of the geophysical data between the source location and each boundary receiver location. As such, the method may apply the second interferometry on an estimate of the direct ground roll between the source location and each boundary receiver location and the estimate of the direct ground roll between the receiver location and each boundary receiver location to generate an interferometric estimate of a direct ground roll between the source location and the receiver location. The method may then remove the interferometric estimate of the direct ground roll between the source location and the receiver location from geophysical data acquired at the receiver location due to a source at the source location.

In yet another implementation, the method for processing geophysical data described above may perform the second interferometry using an estimate of a scattered ground roll between the source location and each boundary receiver location in place of the geophysical data between the source location and each boundary receiver location. As such, the method may apply a second interferometry on the estimate of the scattered ground roll between the source location and each boundary receiver location and the interferometric estimate of the direct ground roll between the receiver location and each boundary receiver location to generate an interferometric estimate of a scattered ground roll between the source location and the receiver location. The method may then include removing the estimate of the scattered ground roll between the source location and the receiver location from geophysical data acquired at the receiver location due to a source at the source location.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
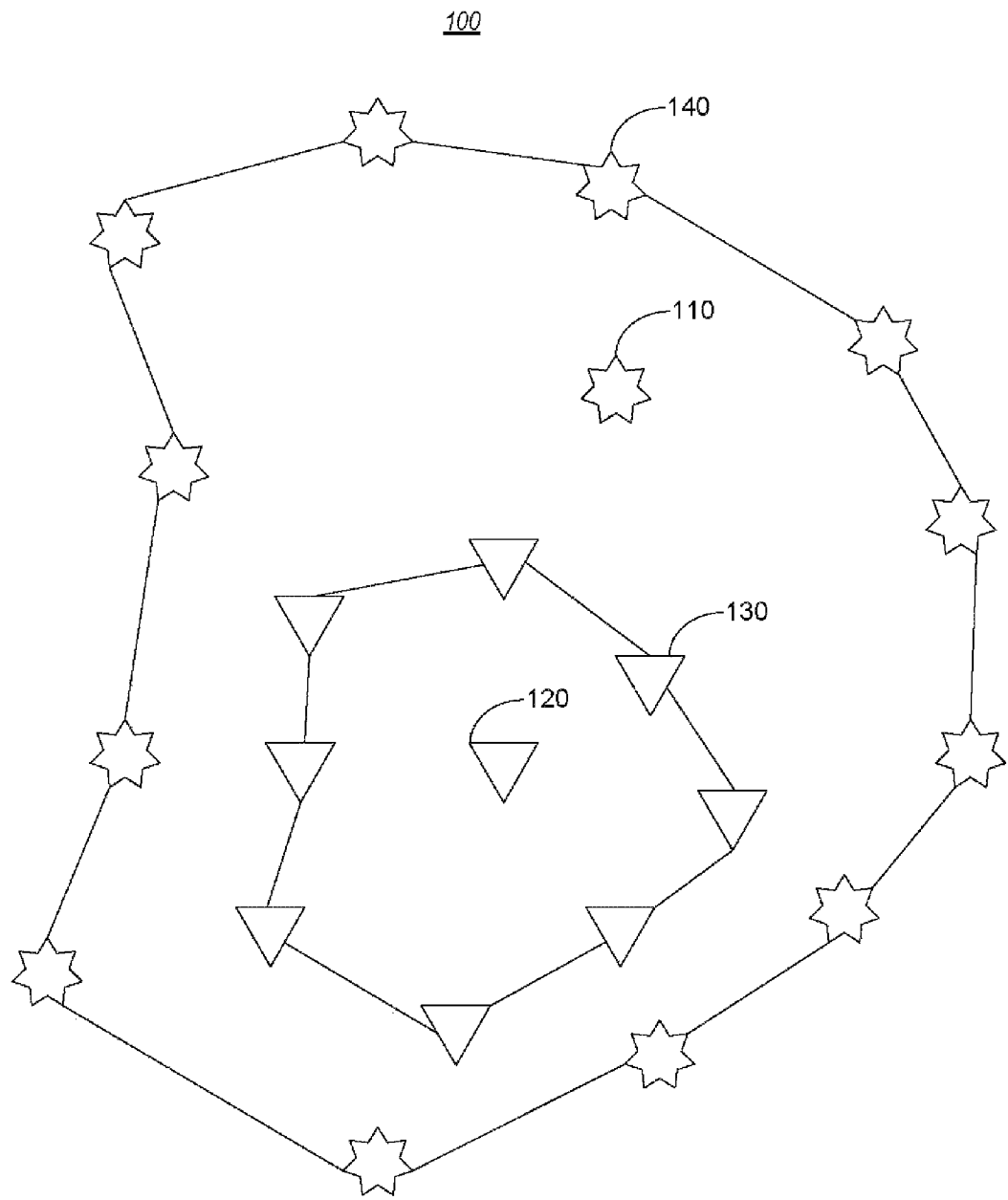
FIGS. 1-4 illustrate schematic diagrams of source and receiver configurations in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description of one or more implementations of various technologies and techniques directed at removing ground roll from seismic data using source-receiver interferometry. In one implementation, a method for removing ground roll from seismic data using source-receiver interferometry may be performed by a computer application. Initially, the computer application may receive seismic data that may have been acquired from one or more boundary receivers (R) and a specified receiver (R1) in a seismic survey due to one or more boundary sources (S) and a specified source (S1) in the survey area. The computer application may then extract a simple estimate of the direct ground roll between each boundary source (S) and each receiver in the survey area from the seismic data acquired from the boundary receivers (R) and the specified receiver (R1) in the seismic survey. The simple estimate of ground roll may be obtained using conventional seismic processing techniques such as frequency-wavenumber filtering, band-pass filtering, time windowing and the like. Next, the computer application may perform interferometry on the simple estimate of the direct ground roll between the specified receiver (R1) and each boundary source (S) and the simple estimate of the direct ground roll between each boundary receiver (R) and each boundary source (S). As a result, the computer application may obtain an interferometric estimate of the direct ground roll between the specified receiver (R1) and each boundary receiver (R).

After obtaining the estimate of the direct ground roll between the specified receiver (R1) and each boundary receiver (R), the computer application may make a simple estimate of the ground roll between the specified source (S1) and each boundary receiver (R) by applying a filter or a time window to the seismic data received at each boundary receiver (R) due to the specified source (S1). The computer application may then perform interferometry between the interferometric estimate of the direct ground roll between the specified receiver (R1) and each boundary receiver (R) and the simple estimate of the ground roll between the specified source (S1) and each boundary receiver (R). As a result, an interferometric estimate of the ground roll between the specified source (S1) and the specified receiver (R1) may be obtained. The simple estimate of the ground roll between the specified source (S1) and each boundary receiver (R) may differ from the interferometric estimate of the ground roll between the specified source (S1) and the specified receiver (R1) in that the simple estimate may contain both the direct and scattered ground roll and body waves. However, when determining the interferometric estimate of the ground roll between the specified source (S1) and the specified receiver (R1), as described above, the body waves are eliminated from the simple estimate of the ground roll between the specified source (S1) and each boundary receiver (R). The computer application may then remove the interferometric estimate of the ground roll between the specified source (S1) and the specified receiver (R1) from seismic data between the specified source (S1) and the specified receiver (R1) to remove the ground roll from the seismic data.

Various techniques for removing ground roll from seismic data using source-receiver interferometry will now be described in more detail with reference to FIGS. 1-6 in the following paragraphs.

FIG. 1 illustrates a schematic diagram of a source and receiver configuration in accordance with implementations of various techniques described herein. The source and receiver configuration 100 includes a source 110, a receiver 120, boundary receivers 130 and boundary sources 140. Source 110 and boundary sources 140 may include any type of seismic source such as a vibrator, airgun and the like. Receiver 120 and boundary receivers 130 may include any type of seismic receivers such as geophone, hydrophone or the like. Although source and receiver configuration 100 has been illustrated with boundary receivers 130 and boundary sources 140, according to source-receiver reciprocity, the methods described herein may also be applied to a source and receiver configuration having boundary sources located where boundary receivers 130 are located and boundary receivers located where boundary sources 140 are located, a source located where receiver 120 is located, and a receiver located where source 110 is located.

The source and receiver configuration 100 may be installed on the surface of the earth as part of a land seismic survey or on a seabed as part of an ocean bottom seismic survey. The source 110 and boundary sources 140 may generate a plurality of seismic survey signals in accordance with conventional practice. The seismic survey signals may propagate through the surface of the earth to a geological formation within the earth. The seismic survey signal may then be reflected by a reflector inside the earth. The receiver 120 and boundary receivers 130 may receive the reflected signals from the geological formation in a conventional manner. The receiver 120 and boundary receivers 130 may then generate data representative of the reflections including the seismic data embedded in electromagnetic signals. The electromagnetic signals may be electrical or optical. The seismic survey signals and the reflections may be comprised of what are known as "body waves," or waves that propagate into the geological formation of the earth. Body waves may comprise what are more technically known as pressure waves ("P-waves") and shear waves ("S-waves").

In addition to the body waves, source 110 and boundary sources 140 may also generate interface waves, i.e., the ground roll. Note that, in a seabed or ocean bottom survey, the interface waves may be referred to as Scholte waves. Ground roll propagates, as mentioned above, at the interface between two media, as opposed to through a medium, e.g., layers of the earth. The ground roll may propagate at the interface between the geological formation and the air. The ground roll may then be acquired by receiver 120 and boundary receivers 130 along with the body waves. Thus, the data acquired by receiver 120 and boundary receivers 130 may also include ground roll data along with body wave data, which may be undesirable. In one implementation, in addition to controlled sources like source 110 or boundary sources 140, other sources such as noise sources in the earth may also generate ground roll.

Figure 2:
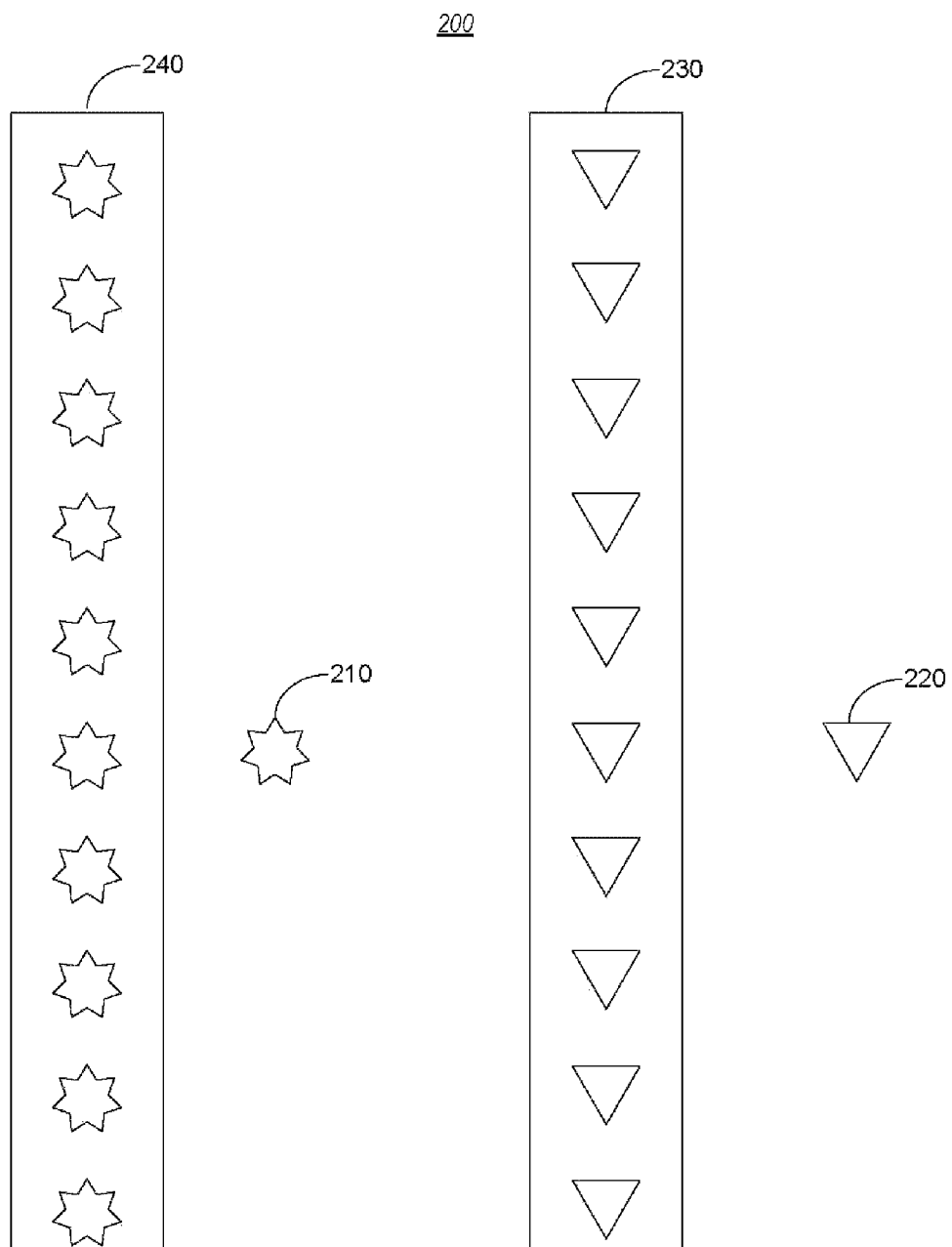

FIG. 2 illustrates a schematic diagram of a source and receiver configuration in accordance with implementations of various techniques described herein. The source and receiver configuration 200 includes a source 210, a receiver 220, boundary receivers 230 and boundary sources 240. The source 210, receiver 220, boundary receivers 230 and boundary sources 240 may correspond to the descriptions of source 110, receiver 120, boundary receivers 130 and boundary sources 140, respectively. Like the source and receiver configuration 100, it should be noted that the methods described herein may also be applied to a source and receiver configuration having boundary sources at boundary receiver 230 locations, boundary receivers at boundary source 240 locations, a source at receiver 220 location, and a receiver at source 210 location according to source-receiver reciprocity. The source and receiver configuration 200 may be referred to as an "open" source-receiver geometry configuration, which may cause edge effects during interferometry. These edge effects will be discussed in more detail with reference to FIG. 5 below.

Figure 3:
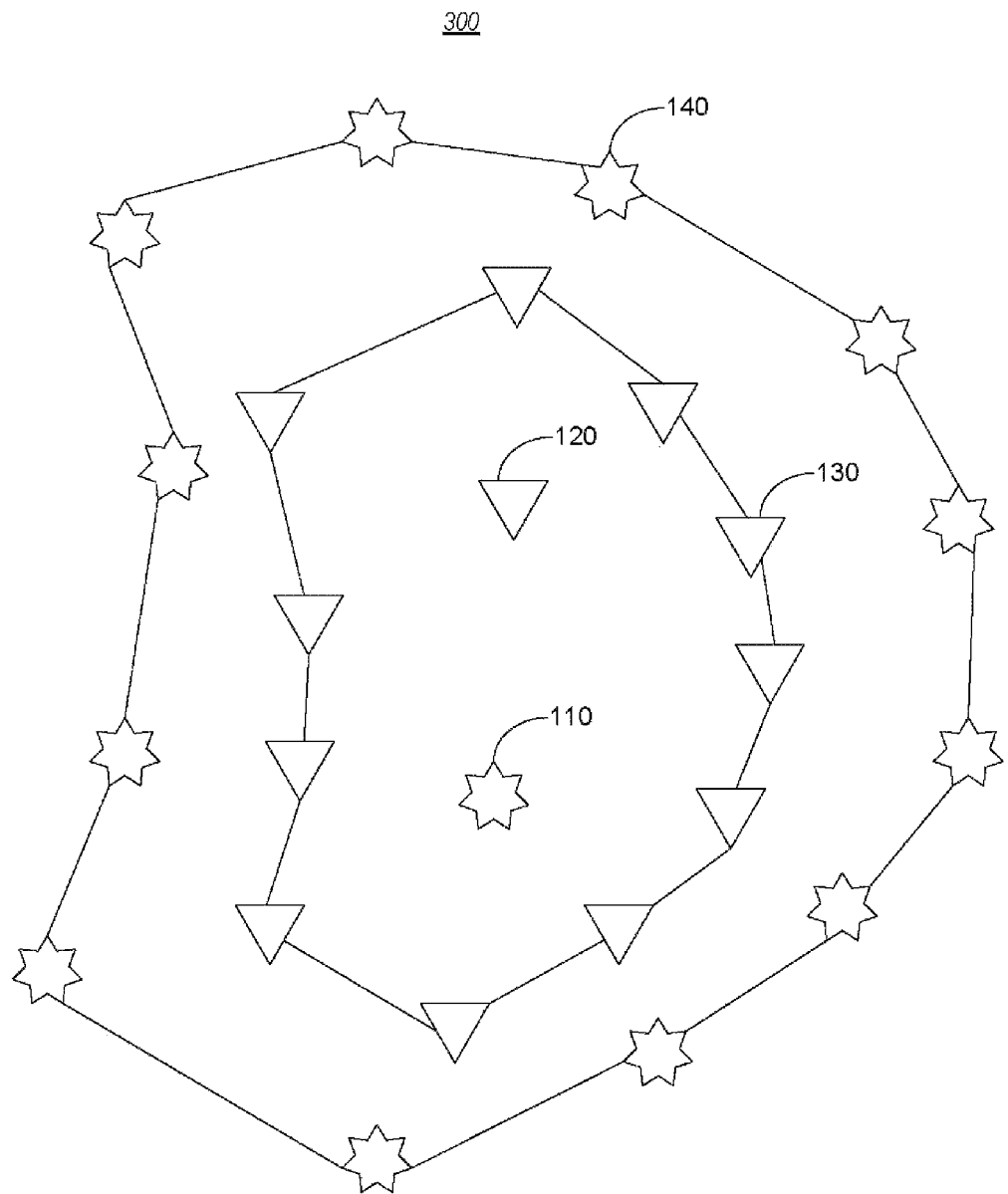
Figure 4:
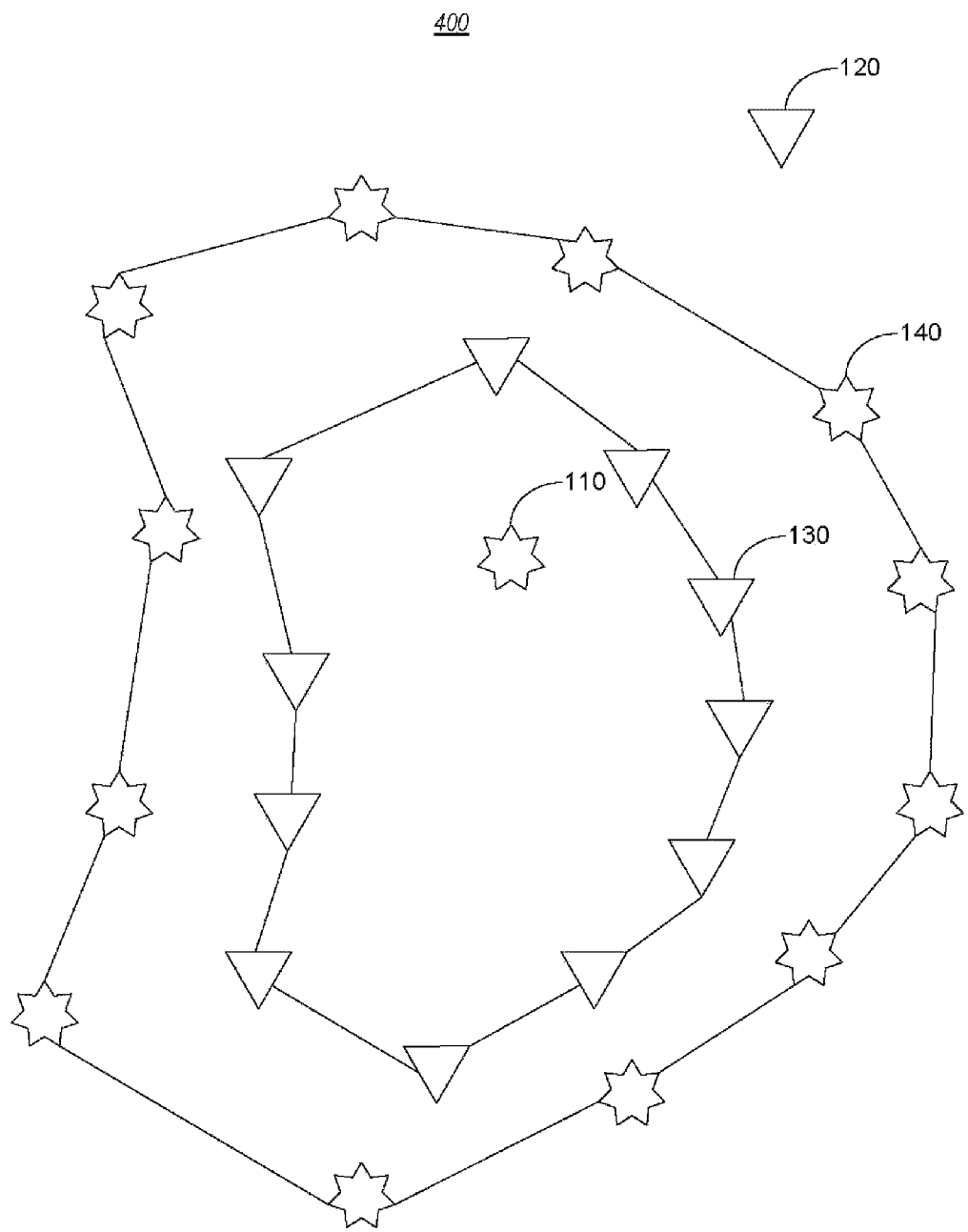

FIGS. 3-4 illustrate schematic diagrams of source and receiver configurations in accordance with implementations of various techniques described herein. Each source-receiver configuration in FIGS. 3-4 includes a source 110, receiver 120, boundary receivers 130 and boundary sources 140 that correspond to the descriptions of source 110, receiver 120, boundary receivers 130 and boundary sources 140 provided with reference to FIG. 1.

FIG. 3 illustrates a source-receiver configuration 300 such that source 110 and receiver 120 are within boundary receivers 130 and boundary sources 140. FIG. 4 illustrates a source-receiver configuration 400 such that source 110 is within boundary receivers 130 and boundary sources 140 and receiver 120 is outside boundary receivers 130 and boundary sources 140.

The various techniques described herein to remove ground roll from seismic data using source-receiver interferometry may depend on the configuration of the sources and the receivers in the seismic survey. Additional details as to how source-receiver configurations 300-400 may affect the various techniques described herein will be discussed in more detail with reference to FIG. 5 below.

Figure 5:
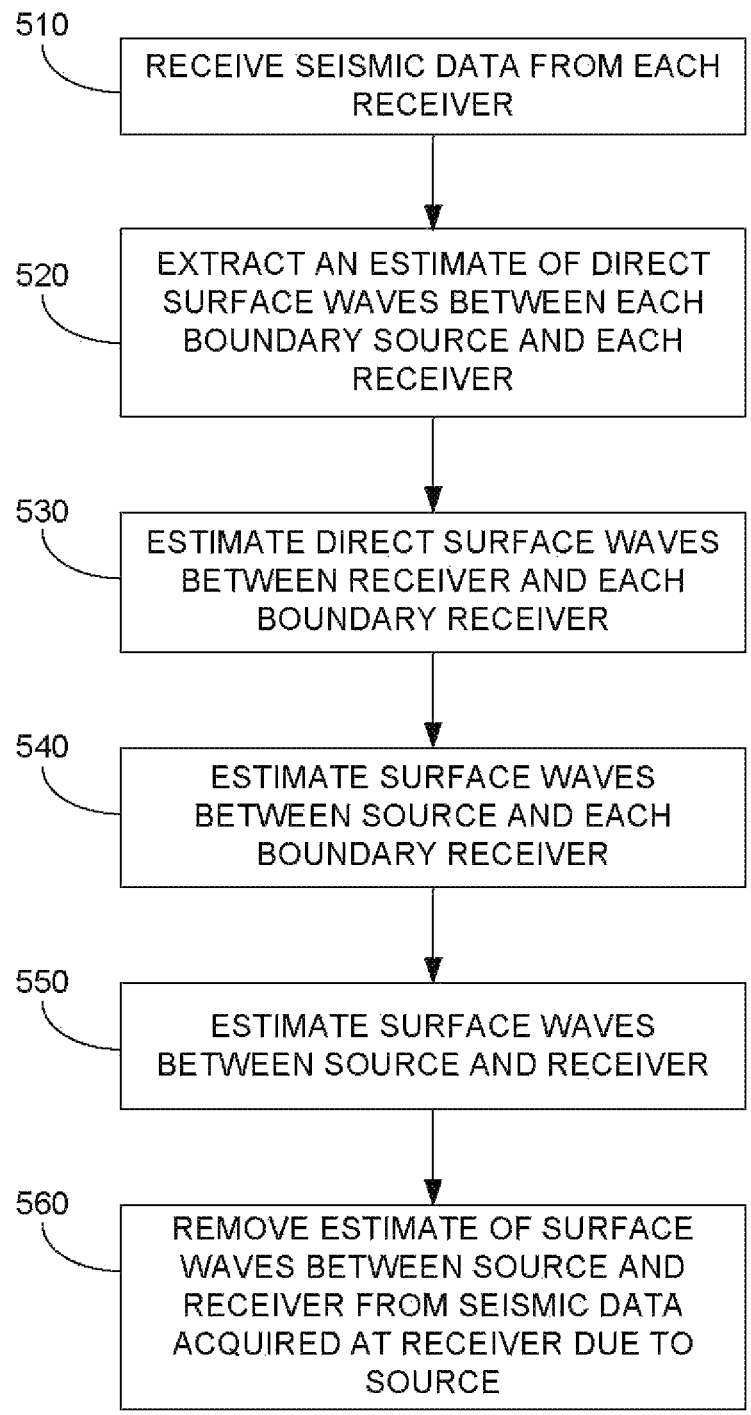
FIG. 5 illustrates a flow diagram of a method for removing ground roll from seismic data using source-receiver interferometry in accordance with one or more implementations of various techniques described herein.

FIG. 5 illustrates a flow diagram of a method for removing ground roll from seismic data using source-receiver interferometry in accordance with one or more implementations of various techniques described herein. In one implementation, the method for removing ground roll from seismic data using source-receiver interferometry may be performed by a computer application. It should be understood that while the flow diagram indicates a particular order of execution of the operations, in some implementations, certain portions of the operations might be executed in a different order. Although method 500 is described herein as removing ground roll from seismic data using seismic data acquired at receivers, it should be understood that method 500 is not limited to only seismic data but may be used for other types of geophysical data.

For purposes of discussing method 500, the following steps of method 500 will be described with reference to the source and receiver configuration 100 of FIG. 1. As such, receiver 120 is located within a boundary formed by boundary receivers 130 and source 110 is located inside a boundary formed by the boundary sources 140 but outside the boundary formed by boundary receivers 130. However, method 500 is not limited to the source and receiver configuration of FIG. 1; instead it should be understood that method 500 may be used in a variety of source and receiver configurations. In one implementation, source and receiver locations may be interchanged using reciprocity, allowing for the application of method 500 in slightly different configurations. In another implementation, method 500 may be adapted for source-receiver configuration 300 or source-receiver configuration 400. This flexibility may allow method 500 to be applied using a range of different source and receiver distributions.

Generally, the seismic data acquired by receiver 120 may include a seismic wavefield that is composed of three parts: (1) the direct ground roll that propagates between source and receiver locations unaffected by near-surface heterogeneity; (2) the scattered ground roll that propagates between source and receiver locations via near-surface heterogeneities; and (3) the body waves that propagate between source and receiver locations, including reflected waves, multiple reflections, diffractions, refracted waves, and the like. As such, method 500 may be used to isolate the body waves in (3) by eliminating the contribution of the direct ground roll in (1) and the scattered ground roll in (2). While the separation of the waves in the direct ground roll in (1) from the scattered ground roll in (2) and the body waves in (3) can be achieved using conventional processing techniques, the separation of the scattered ground roll in (2) from the body waves in (3) is not straightforward.

Conventional processing techniques can be used to make estimates of the scattered ground roll in (2) by removing the direct waves in (1) from the full wavefield, band-pass filtering the result, and muting any early arrivals that can be identified as missing from the scattered ground roll in (2). While this result contains those body waves in (3), conventional processing techniques indicate that this is an appropriate guess of the scattered ground roll in (2) for the application of interferometry to create a better estimate of the scattered ground roll. Conventional processing techniques may then isolate the body waves in (3) after adaptively subtracting the interferometric estimates from the seismic data. Method 500, as described below, may use source-receiver interferometry such that only scattered waves are estimated between source 110 and receiver 120, thereby adaptively subtracting the ground roll estimated from a real source and a real receiver.

At step 510, the computer application may receive seismic data that may have been acquired from each boundary receiver 130 and receiver 120. In one implementation, the seismic data may include seismic data received at receiver 120 and boundary receivers 130 after source 110 and each boundary source 140 have been actuated.

At step 520, the computer application may extract a simple estimate of direct ground roll between each boundary source 140 and each receiver (i.e., receiver 120 and boundary receivers 130) from the seismic data received at step 510. In one implementation, the simple estimate of direct ground roll between each boundary source 140 and each receiver may be extracted from the seismic data received at step 510 using a conventional seismic processing technique. As mentioned above, the simple estimate of ground roll may be obtained using conventional seismic processing techniques such as frequency-wavenumber filtering, band-pass filtering, time windowing and the like. The conventional seismic processing technique may separate direct ground roll in the seismic data from the rest of the seismic data received at step 510.

At step 530, the computer application may perform interferometry on the simple estimate of direct ground roll between receiver 120 and each boundary source 140 and the simple estimate of direct ground roll between each boundary receiver 130 and each boundary source 140. In one implementation, for source-receiver configuration 100 and 300, the computer application may perform interferometry on these two estimates by cross correlating the simple estimate of direct ground roll between receiver 120 and each boundary source 140 with the simple estimate of direct ground roll between each boundary receiver 130 and each boundary source 140. After cross correlating these two estimates, the computer application may sum the results of the cross correlations together. After performing the interferometry, the computer application may obtain an interferometric estimate of the direct ground roll between receiver 120 and each boundary receiver 130.

In one implementation, if the seismic data has been acquired from a source and receiver configuration as shown in FIG. 2 (i.e., orthogonal array of receivers) or any other "open" geometry receiver configuration, the computer application may apply a spatial taper to the simple estimate of direct ground roll between receiver 120 and each boundary source 140 and the simple estimate of direct ground roll between each boundary receiver 130 and each boundary source 140 before performing the interferometry at step 530. By applying the spatial taper, the computer application may suppress edge effects that may be present in the interferometric estimate of the direct ground roll between receiver 120 and each boundary receiver 130 due to the interferometry performed at step 530. The edge effects may occur in any open geometry configuration of the boundary receivers 130.

At step 530, if the sources and receivers were arranged as shown in source-receiver configuration 400, the computer application may perform interferometry at step 530 using a cross-convolution technique. That is, if source 110 is positioned inside the boundaries formed by boundary receivers 130 and the boundary sources 140, and receiver 120 is positioned outside the boundaries formed by boundary receivers 130 and the boundary sources 140, the computer application may perform interferometry on the simple estimates using a cross-convolution technique to obtain a more accurate interferometric estimate of the direct and scattered ground roll between source 110 and receiver 120 at step 550.

At step 540, the computer application may make a simple estimate of the direct and scattered ground roll between source 110 and each boundary receiver 130. In one implementation, these direct and scattered ground roll may be estimated by processing the seismic data acquired at the boundary receivers 130 due to the source 110. The seismic data processing may include applying a band pass filter on the seismic data, analyzing the arrival times of the seismic data via time windowing, or the like. It should be noted that step 540 is an optional step in method 500, and in some implementations the computer application may proceed to step 550 in lieu of step 540.

In one implementation, if the seismic data has been acquired from a source and receiver configuration as shown in FIG. 2 (i.e., orthogonal array of receivers) or any other "open" geometry receiver configuration, the computer application may apply a spatial taper to the simple estimate of the direct and scattered ground roll between source 110 and each boundary receiver 130 (obtained from step 540) to suppress edge effects that may be present in the interferometric estimate of the ground roll between the source 110 and the receiver 120 as determined at step 550 below. As mentioned above, the edge effects may occur due to the open geometry configuration of the boundary receivers 130.

At step 550, the computer application may perform interferometry between the interferometric estimate of the direct ground roll between receiver 120 and each boundary receiver 130 obtained at step 530 and the simple estimate of the direct and scattered ground roll between source 110 and each boundary receiver 130 obtained at step 540. In one implementation, for source-receiver configuration 100, the computer application may apply interferometry by cross convolving the interferometric estimate of the direct ground roll between receiver 120 and each boundary receiver 130 (obtained at step 530) with the simple estimate of the direct and scattered ground roll between source 110 and each boundary receiver 130 (obtained at step 540). After cross convoluting these two estimates, the computer application may then sum the results of the cross convolutions together. As a result, the computer application may obtain an interferometric estimate of the direct and scattered ground roll between source 110 and receiver 120.

Although the interferometry performed in step 550 used a cross convolution technique, if the sources and receivers were arranged as shown in source-receiver configuration 300, the computer application may perform interferometry at step 550 using a cross-correlation technique. That is, if source 110 and receiver 120 are both positioned inside the boundary formed by boundary receivers 130 and the boundary sources 140, the computer application may perform interferometry at step 550 on the estimates using a cross-correlation technique to obtain a more accurate interferometric estimate of the direct and scattered ground roll between source 110 and receiver 120.

Alternatively, if the sources and receivers were arranged as shown in source-receiver configuration 400, the computer application may perform interferometry at step 550 using a cross-convolution technique. That is, if source 110 is positioned inside the boundaries formed by boundary receivers 130 and the boundary sources 140, and receiver 120 is positioned outside the boundaries formed by boundary receivers 130 and the boundary sources 140, the computer application may perform the interferometry at step 550 on the estimates using a cross-convolution technique to obtain a more accurate interferometric estimate of the direct and scattered ground roll between source 110 and receiver 120.

As mentioned above, step 540 is optional and the computer application may skip step 540 and proceed to step 550 from step 530. In this case, the computer application may apply interferometry between the seismic data between source 110 and each boundary receiver 130 (i.e., seismic data received at boundary receivers 130 due to source 110) and the interferometric estimate of the direct ground roll between receiver 120 and each boundary receiver 130 obtained from step 530. In one implementation, if the seismic data has been acquired from a source and receiver configuration as shown in FIG. 2 (i.e., orthogonal array of receivers) or any other "open" geometry receiver configuration, the computer application may apply a spatial taper to the seismic data between source 110 and each boundary receiver 130 to suppress edge effects that may be present in the estimate of the ground roll between the source 110 and the receiver 120 as determined at step 550.

In one implementation, in order to estimate all direct and scattered ground roll between source 110 and receiver 120, the boundary receivers 130 should be a closed configuration as shown in FIG. 1. However, as mentioned above, if the boundary receivers 130 are not in a closed configuration, the computer application may perform various processing steps (e.g., apply weighting function, apply spatial taper) at various steps in method 500 to compensate for edge effects that may be present in the interferometric estimate of the direct ground roll between receiver 120 and each boundary receiver 130 determined at step 530 and in the simple estimate of the direct and scattered ground roll between the source 110 and the receiver 120 determined at step 550 due to the open geometry configuration of the boundary receivers 130.

In another implementation, method 500 may be configured to estimate just the direct ground roll between source 110 and receiver 120. In this case, after estimating the direct and scattered ground roll between source 110 and each boundary receiver 130 at step 540, the computer application may isolate the direct ground roll from the estimate of the direct and scattered ground roll between source 110 and each boundary receiver 130. As a result, at step 550, the computer application may apply interferometry between the interferometric estimate of the direct ground roll between source 110 and each boundary receiver 130 obtained at step 540 and the simple estimate of the direct ground roll between receiver 120 and each boundary receiver 130 obtained at step 530 to obtain an interferometric estimate of the direct ground roll between source 110 and receiver 120 at step 550.

In yet another implementation, method 500 may be configured to estimate just the scattered ground roll between source 110 and receiver 120. In this case, after estimating the direct and scattered ground roll between source 110 and each boundary receiver 130 at step 540, the computer application may isolate the scattered ground roll from the estimate of the direct and scattered ground roll between source 110 and each boundary receiver 130. As a result, at step 550, the computer application may apply interferometry between the interferometric estimate of the direct ground roll between source 110 and each boundary receiver 130 obtained at step 540 and the simple estimate of the scattered ground roll between receiver 120 and each boundary receiver 130 obtained at step 530 to obtain an interferometric estimate of the scattered ground roll between source 110 and receiver 120 at step 550.

At step 560, the computer application may remove the interferometric estimate of the direct and scattered ground roll between source 110 and receiver 120 from the seismic data acquired at receiver 120 due to source 110. By removing the interferometric estimate of the direct and scattered ground roll between source 110 and receiver 120 from the seismic data acquired at receiver 120, the computer application may reduce or eliminate the ground roll from the seismic data acquired at receiver 120.

In one implementation, if the seismic data received at any of the receivers include two or more distinct ground roll modes that overlap in the frequency domain, the computer application may separate the ground roll modes prior to step 550 and then add their contributions to the estimated direct and scattered ground roll between source 110 and receiver 120 between steps 550 and 560.

Figure 6:
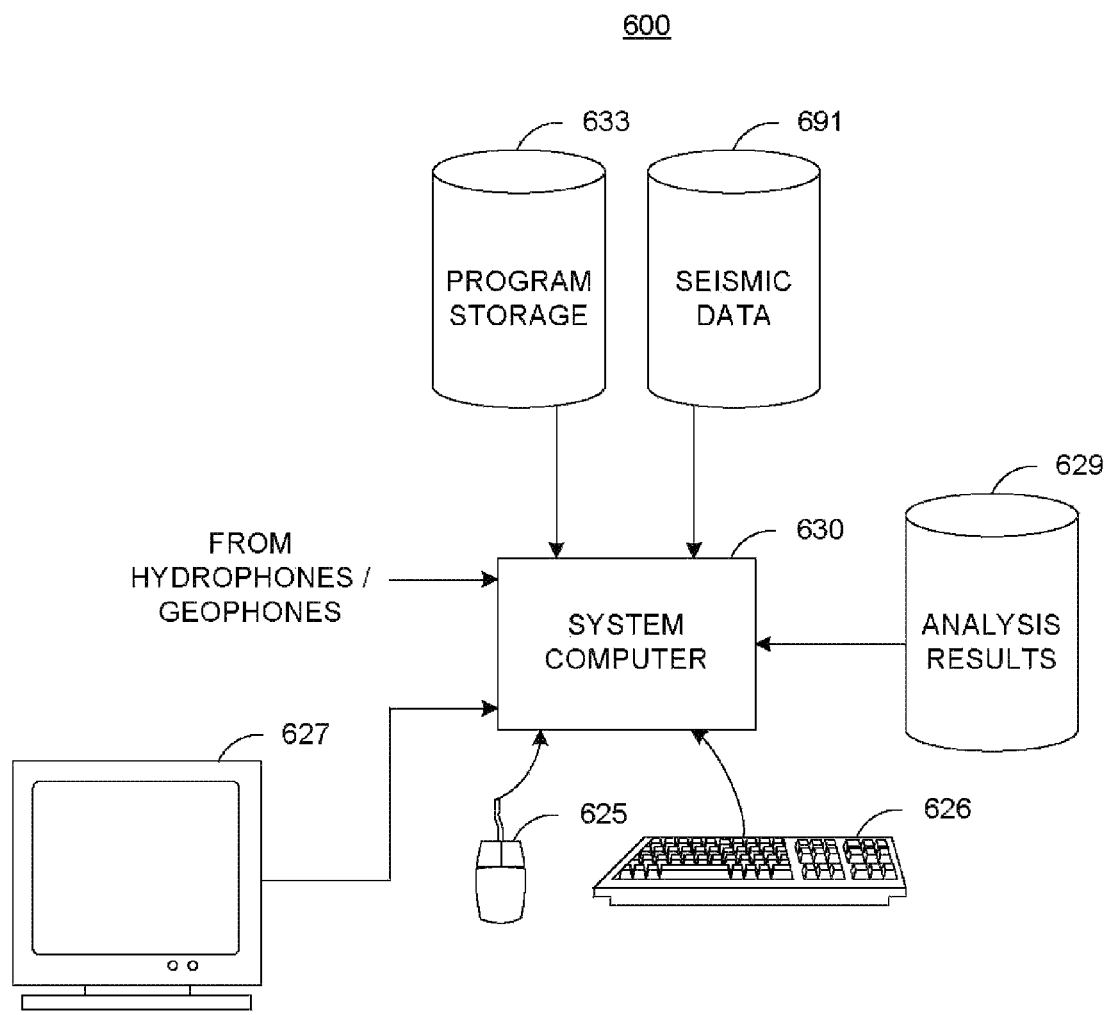
FIG. 6 illustrates a computer network into which implementations of various technologies described herein may be implemented.

FIG. 6 illustrates a computer network 600 into which implementations of various technologies described herein may be implemented. In one implementation, various techniques for determining the removing ground roll from seismic data using source-receiver interferometry as described in FIG. 5 may be performed on the computer network 600. The computer network 600 may include a system computer 630, which may be implemented as any conventional personal computer or server. However, it should be understood that implementations of various technologies described herein may be practiced in other computer system configurations, including hypertext transfer protocol (HTTP) servers, handheld devices, multiprocessor systems, microprocessor-based or programmable consumer electronics, network PCs, minicomputers, mainframe computers, high-performance clusters of computers, co-processing-based systems (GPUs, FPGAs) and the like. In one implementation, the computer application described in the method 500 may be stored on the system computer 630.

The system computer 630 may be in communication with disk storage devices 629, 631, and 633, which may be external hard disk storage devices. It is contemplated that disk storage devices 629, 631, and 633 are conventional hard disk drives, and as such, will be implemented by way of a local area network or by remote access. Of course, while disk storage devices 629, 631, and 633 are illustrated as separate devices, a single disk storage device may be used to store any and all of the program instructions, measurement data, and results as desired.

In one implementation, seismic data from the receivers may be stored in disk storage device 631. The system computer 630 may retrieve the appropriate data from the disk storage device 631 to process seismic data according to program instructions that correspond to implementations of various technologies described herein. Seismic data may include pressure and particle velocity data. The program instructions may be written in a computer programming language, such as C++, Java and the like. The program instructions may be stored in a computer-readable memory, such as program disk storage device 633. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 600.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 630 may present output primarily onto graphics display 627. The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located at a data center remote from the survey region. The system computer 630 may be in communication with the receivers (either directly or via a recording unit, not shown), to receive signals indicative of the reflected seismic energy. After conventional formatting and other initial processing, these signals may be stored by the system computer 630 as digital data in the disk storage 631 for subsequent retrieval and processing in the manner described above. In one implementation, these signals and data may be sent to the system computer 630 directly from sensors, such as geophones, hydrophones and the like. When receiving data directly from the sensors, the system computer 630 may be described as part of an in-field data processing system. In another implementation, the system computer 630 may process seismic data already stored in the disk storage 631. When processing data stored in the disk storage 631, the system computer 630 may be described as part of a remote data processing center, separate from data acquisition. The system computer 630 may be configured to process data as part of the in-field data processing system, the remote data processing system or a combination thereof. While FIG. 6 illustrates the disk storage 631 as directly connected to the system computer 630, it is also contemplated that the disk storage device 631 may be accessible through a local area network or by remote access. Furthermore, while disk storage devices 629, 631 are illustrated as separate devices for storing input seismic data and analysis results, the disk storage devices 629, 631 may be implemented within a single disk drive (either together with or separately from program disk storage device 633), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing geophysical data, comprising:

applying, by a computer, a first interferometry on an estimate of a direct ground roll between a receiver location and one or more boundary source locations and an estimate of a direct ground roll between one or more boundary receiver locations and the one or more boundary source locations to generate an interferometric estimate of a direct ground roll between the receiver location and the one or more boundary receiver locations;

applying, by the computer, a second interferometry on geophysical data between a source location and the one or more boundary receiver locations and the interferometric estimate of the direct ground roll to generate an interferometric estimate of a direct and scattered ground roll between the source location and the receiver location; and removing, by the computer, the interferometric estimate of the direct and scattered ground roll between the source location and the receiver location from geophysical data acquired at the receiver location due to a source at the source location.

2. The method of claim 1, further comprising suppressing one or more edge effects in the interferometric estimate of the direct ground roll between the receiver location and the one or more boundary receiver locations if the one or more boundary receiver locations are arranged in an open geometry configuration.

3. The method of claim 2, wherein suppressing the one or more edge effects comprises:

applying a first spatial taper to the estimate of the direct ground roll between the receiver location and the one or more boundary source locations; and applying a second spatial taper to the estimate of the direct ground roll between the one or more boundary receiver locations and the one or more boundary source locations.

4. The method of claim 1, wherein the geophysical data between the source location and the one or more boundary receiver locations comprises an estimate of a ground roll between the source location and the one or more boundary receiver locations.

5. The method of claim 4, wherein the estimate of the ground roll between the source location and the one or more boundary receiver locations is determined by applying a band pass filter on geophysical data acquired at the one or more boundary receiver locations due to the source.

6. The method of claim 4, wherein the estimate of the ground roll between the source location and the one or more boundary receiver locations is determined by analyzing one or more arrival times of geophysical data acquired at the one or more boundary receiver locations due to the source via time windowing.

7. The method of claim 4, further comprising suppressing one or more edge effects in the interferometric estimate of the direct and scattered ground roll between the source location and the receiver location if the one or more boundary receiver locations are arranged in an open geometry configuration, wherein suppressing the one or more edge effects comprises applying a spatial taper to the estimate of the ground roll between the source location and the one or more boundary receiver locations.

8. The method of claim 1, further comprising suppressing one or more edge effects in the interferometric estimate of the direct and scattered ground roll between the source location and the receiver location if the one or more boundary receiver locations are arranged in an open geometry configuration, wherein suppressing the one or more edge effects comprises applying a spatial taper to the geophysical data between the source location and the one or more boundary receiver locations.

9. The method of claim 1, wherein the first interferometry comprises:

cross correlating the estimate of the direct ground roll between the receiver location and the one or more boundary source locations with the estimate of the direct ground roll between the one or more boundary receiver locations and the one or more boundary source locations; and adding results of the cross correlating.

10. The method of claim 1, wherein the first interferometry comprises:

cross convoluting the estimate of the direct ground roll between the receiver location and the one or more boundary source locations with the estimate of the direct ground roll between the one or more boundary receiver locations and the one or more boundary source locations; and adding results of the cross convoluting.

11. The method of claim 4, wherein the second interferometry comprises:

cross correlating the estimate of the ground roll between the source location and the one or more boundary receiver locations with the interferometric estimate of the direct ground roll between the receiver location and the one or more boundary receiver locations; and adding results of the cross correlating.

12. The method of claim 4, wherein the second interferometry comprises:

cross convoluting the estimate of the ground roll between the source location and the one or more boundary receiver locations with the interferometric estimate of the direct ground roll between the receiver location and the one or more boundary receiver locations; and adding results of the cross convoluting.

13. The method of claim 1, wherein the receiver location is inside a boundary formed by the one or more boundary receiver locations and the source location is inside a boundary formed by the one or more boundary source locations but outside the boundary formed by the one or more boundary receiver locations.

14. The method of claim 1, wherein the source location and the receiver location are inside a boundary formed by the one or more boundary receiver locations and inside a boundary formed by the one or more boundary source locations.

15. The method of claim 1, wherein the source location is inside a boundary formed by the one or more boundary receiver locations and a boundary formed by the one or more boundary source locations, and the receiver location is outside the boundary formed by the one or more boundary receiver locations and outside the boundary formed by the one or more boundary source locations.

16. The method of claim 1, wherein the one or more boundary source locations are outside a boundary formed by the one or more boundary receiver locations.

17. The method of claim 1, wherein the estimate of the direct ground roll between the receiver location and the one or more boundary source locations and the estimate of the direct ground roll between the one or more boundary receiver locations and the one or more boundary source locations are determined using frequency-wavenumber filtering, bandpass filtering, time windowing or combinations thereof.

18. The method of claim 1, further comprising:
receiving geophysical data acquired at the one or more boundary receiver locations and the receiver location;
extracting the estimate of the direct ground roll between the receiver location and the one or more boundary source locations from the geophysical data acquired at the one or more boundary receiver locations and the receiver location; and
extracting the estimate of the direct ground roll between the one or more boundary receiver locations and the one or more boundary source locations from the geophysical data acquired at the one or more boundary receiver locations and the receiver location.

19. A non-transitory computer-readable storage medium storing instructions for processing geophysical data, the instructions upon execution causing a computer system to:
apply a first interferometry on an estimate of a direct ground roll between a receiver location and one or more boundary source locations and an estimate of a direct ground roll between one or more boundary receiver locations and the one or more boundary source locations to generate an interferometric estimate of a direct ground roll between the receiver location and the one or more boundary receiver locations;
estimate a direct ground roll between a source location and the one or more boundary receiver locations;
apply a second interferometry on the estimate of the direct ground roll between the source location and the one or more boundary receiver locations and the interferometric estimate of the direct ground roll to generate an interferometric estimate of a direct ground roll between the source location and the receiver location; and
remove the interferometric estimate of the direct ground roll between the source location and the receiver location from geophysical data acquired at the receiver location due to a source at the source location.

20. A computer system comprising:
at least one processor configured to:
apply a first interferometry on an estimate of a direct ground roll between a receiver location and one or more boundary source locations and an estimate of a direct ground roll between one or more boundary receiver locations and the one or more boundary source locations to generate an interferometric estimate of a direct ground roll between the receiver location and the one or more boundary receiver locations;
estimate a scattered ground roll between a source location and the one or more boundary receiver locations;
apply a second interferometry on the estimate of the scattered ground roll between the source location and the one or more boundary receiver locations and the interferometric estimate of the direct ground roll to generate an interferometric estimate of a scattered ground roll between the source location and the receiver location; and
remove the estimate of the scattered ground roll between the source location and the receiver location from geophysical data acquired at the receiver location due to a source at the source location.

21. The computer-readable storage medium of claim 19, wherein estimating the direct ground roll between the source location and the one or more boundary receiver locations comprises isolating the direct ground roll between the source location and the one or more boundary receiver locations from geophysical data acquired between the source location and the one or more boundary receiver locations.

* * * * *